US010180368B2

(12) United States Patent
Smit et al.

(10) Patent No.: US 10,180,368 B2
(45) Date of Patent: Jan. 15, 2019

(54) METHOD AND APPARATUS FOR DETERMINING WHETHER A CYCLIST IS SITTING OR STANDING

(71) Applicant: Garmin Switzerland GmbH, Schaffhausen (CH)

(72) Inventors: Theodorus J. Smit, Calgary (CA); Clark F. Foy, Los Gatos, CA (US); Alan D. Weatherall, San Jose, CA (US); Geoffrey A. Thomas, Cochrane (CA); Kenneth A. Carlson, Gardner, KS (US)

(73) Assignee: Garmin Switzerland GmbH (CH)

( * ) Notice: Subject to any disclaimer, the term of this patent is extended or adjusted under 35 U.S.C. 154(b) by 687 days.

(21) Appl. No.: 14/726,085

(22) Filed: May 29, 2015

(65) Prior Publication Data

US 2015/0345925 A1    Dec. 3, 2015

Related U.S. Application Data

(60) Provisional application No. 62/007,186, filed on Jun. 3, 2014.

(51) Int. Cl.
*A63B 24/00* (2006.01)
*A63B 22/06* (2006.01)
(Continued)

(52) U.S. Cl.
CPC ............... *G01L 5/00* (2013.01); *B62J 99/00* (2013.01); *A63B 22/0605* (2013.01);
(Continued)

(58) Field of Classification Search
CPC ... G01L 5/00; B62J 2009/002; A63B 24/0062
See application file for complete search history.

(56) References Cited

U.S. PATENT DOCUMENTS 6,463,385 B1 * 10/2002 Fry .................... A63B 24/0021
340/427
7,599,806 B2   10/2009 Hauschildt ...................... 702/44
(Continued)

OTHER PUBLICATIONS

Stone et al., Rider/Bicycle Interaction Loads During Standing Treadmill Cycling, Journal of Applied Biomechanjcs, 1993, 9, 202-218.*

(Continued)

*Primary Examiner* — Michael Dalbo
(74) *Attorney, Agent, or Firm* — Samuel M. Korte; Max M. Ali

(57) ABSTRACT

A method and apparatus for determining a bicyclist's bodily position, such as sitting or standing, while riding a bicycle. Sensors measure a force applied by the bicyclist to the pedals. The measurement data is analyzed to identify a feature, such as whether a radial force is higher or lower than a tangential force or whether a total vertical force is high or low, which is indicative of the bicyclist's bodily position. A series of changes in the bicyclist's bodily position during the ride is recorded. A series of changes in the geographic location of the bicyclist and/or a series of changes in one or more performance metrics while riding the bicycle may also be recorded. The series of changes in the bicyclist's bodily position, the geographic location, and the performance metrics may be correlated, graphically communicated in real-time or post-ride, and used to improve the bicyclist's performance.

19 Claims, 7 Drawing Sheets

(51) Int. Cl.
*G01L 5/22* (2006.01)
*B62J 99/00* (2009.01)
*G01L 5/00* (2006.01)

(52) U.S. Cl.
CPC ....... *A63B 24/0062* (2013.01); *A63B 2220/51* (2013.01); *A63B 2220/83* (2013.01); *B62J 2099/002* (2013.01)

(56) References Cited

U.S. PATENT DOCUMENTS

| | | | | |
|---|---|---|---|---|
| 8,011,242 | B2 | 9/2011 | O'Neill et al. | ............. 73/379.01 |
| 8,961,191 | B2 | 2/2015 | Hanshew | ........................ 439/22 |
| 2004/0237666 | A1* | 12/2004 | Winkenbach | ............ B62K 3/02 73/862.49 |
| 2005/0008992 | A1* | 1/2005 | Westergaard | .......... A63B 22/16 434/61 |
| 2007/0245835 | A1* | 10/2007 | Hauschildt | ............. A61B 5/221 73/862.391 |
| 2010/0024590 | A1* | 2/2010 | O'Neill | ................... G01L 3/242 74/594.1 |
| 2012/0210784 | A1 | 8/2012 | Kokkoneva et al. | ........... 73/431 |
| 2012/0330572 | A1* | 12/2012 | Longman | ................ B62M 3/00 702/44 |
| 2013/0053990 | A1* | 2/2013 | Ackland | ................ G06Q 30/02 700/91 |
| 2013/0054143 | A1* | 2/2013 | DeGolier | ................ G01L 1/247 702/3 |
| 2013/0210583 | A1* | 8/2013 | Kametani | ............. A63B 69/16 482/8 |
| 2015/0345952 | A1* | 12/2015 | Chang | .................... G01C 21/12 701/541 |

OTHER PUBLICATIONS

Hochtl et al., Prediction of energy efficient pedal forces in cycling using musculoskeletal simulation models, Procedia Engineering 2 (2010) 3211-3215.*
Printout from http://ieeexplore.ieee.org/xpl/login.jsp?tp=&arnumber=4358887&url=http&3A%2Fieeexplore.ieee.org%2Fxpls&2Fabs_all.jsp&3Farnumber%3D4358887 published prior to May 59, 2015.
Printout from http://ieeexplore.ieee.org/xpl/login.isp?tp=&arnumber=13035638url=http%3A%2F%2Fieeexplore.ieee.org%2Fxpls%2Fabs_all.isp%3Farnumber%3D1303563 published prior to May 59, 2015.
Printout from http://ieeexplore.ieee.org/xpl/login.isp?tp=arnumber=94440&url=http%3A%2F%2Fieeexplore.ieee.org%2Fxpls%2Fabs_all.isp%3Farnumber%3D94440 published prior to May 59, 2015.
Printout from http://www.pioneerelectronics.com/PUSA/Cycle+Sports/Pedaling+Monitor published prior to May 29, 2015.
Printout from https://www.racermateinc.com/ published prior to May 59, 2015.
Printout from http://www.drainmaker.com/2012/07/polar-look-keo-power-systempedal-based.html published prior to May 59, 2015.
Garmin Vector™ Owner's Manual, published Aug. 2013.

* cited by examiner

METHOD AND APPARATUS FOR DETERMINING WHETHER A CYCLIST IS SITTING OR STANDING

RELATED APPLICATIONS

The current U.S. non-provisional patent application claims priority benefit, with regard to all common subject matter, of an earlier-filed U.S. provisional patent application titled "METHOD AND APPARATUS FOR DETERMINING WHETHER A CYCLIST IS SITTING OR STANDING", Application Ser. No. 62/007,186, filed Jun. 3, 2014. The earlier-filed application is hereby incorporated by reference into the current application in its entirety.

BACKGROUND

Bicycles may be configured to measure a bicyclist's level of effort. For example, a bicycle may include a pedal with a pedal spindle provided with one or more sensors configured to measure the forces exerted by the bicyclist on the pedal. More specifically, Garmin's Vector™ pedals incorporate a plurality of sensors that measures the forces applied by a bicyclist to a bicycle's pedals based on an amount of deformation of the bicycle's pedal spindles. This technology is described in U.S. Pat. No. 8,011,242, which is hereby incorporated by reference into the current application in its entirety. The sensors are coupled with a memory element configured to store executable instructions, and a processing element configured to execute those instructions in order to analyze the measured forces and provide information related to the pedaling of the bicyclist. The sensors and/or processing element may be coupled with a display configured to communicate the information to the bicyclist. The information may include a visual indication of the determined forces, where forces are being wasted, and where energy can be saved without affecting driving force and speed. Thus, one use for the information is to improve the pedaling efficiency of the bicyclist by reducing wasted force exerted on the pedal.

SUMMARY

Embodiments of the technology concern a method and apparatus for determining a bicyclist's bodily position, such as sitting or standing, while riding a bicycle. One or more sensors measure a force applied by the bicyclist to the left and right pedals. The measurement data is analyzed to identify a feature, such as whether a radial force is higher or lower than a tangential force or whether a total vertical force is high or low, which is indicative of the bicyclist's bodily position. A series of changes in the bicyclist's bodily position during the ride is recorded. A series of changes in the geographic location of the bicyclist and/or a series of changes in one or more performance metrics while riding the bicycle may also be recorded. The series of changes in the bicyclist's bodily position, the geographic location, and the performance metrics may be correlated, graphically communicated in real-time or post-ride, and used to improve the bicyclist's performance.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
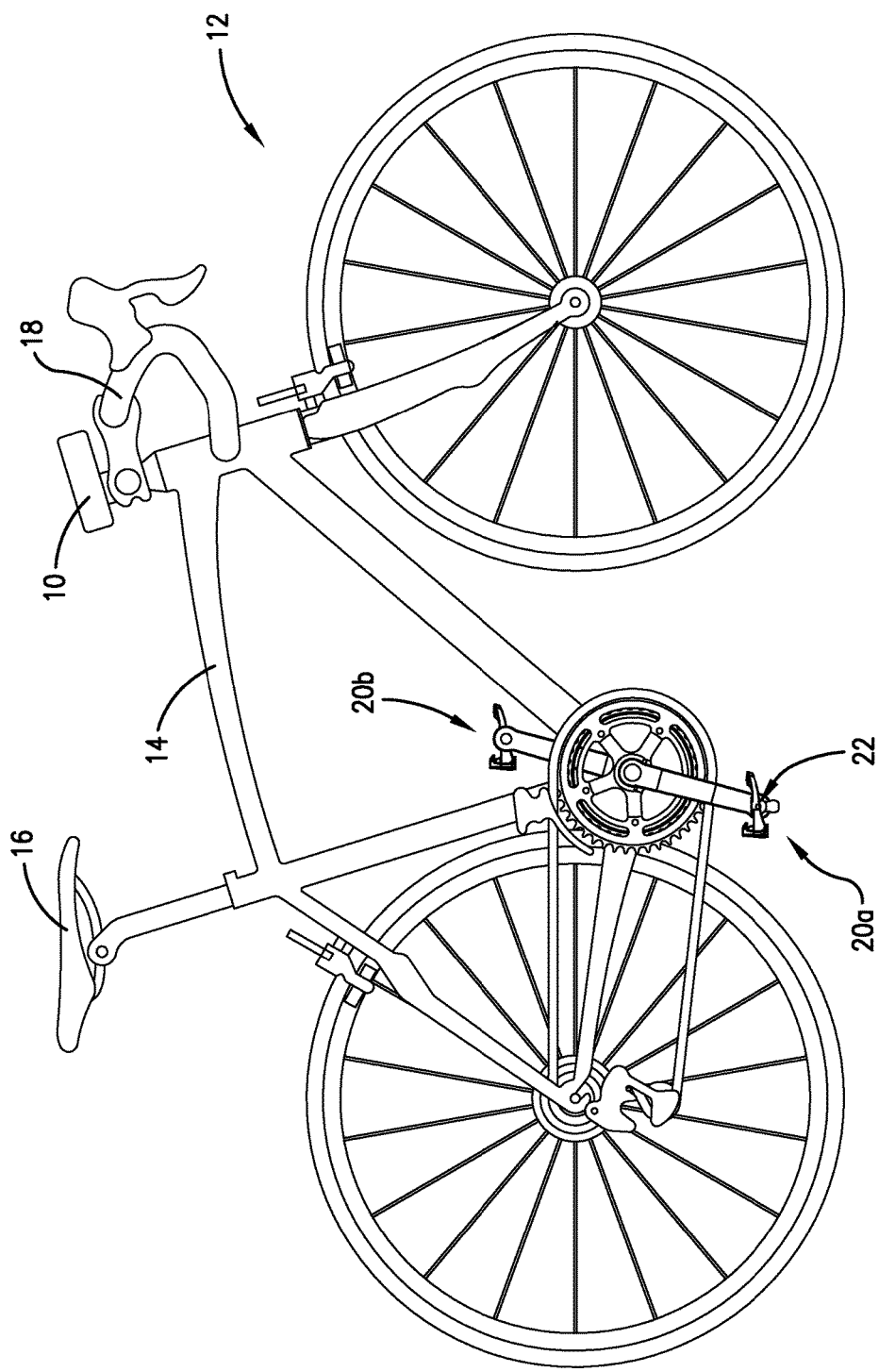
FIG. 1 is a side elevation view of an embodiment of an electronic device configured to determine a bicyclist's bodily position while the bicyclist is riding a bicycle, wherein the electronic device is shown mounted on the bicycle.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology may be practiced. The embodiments are intended to describe aspects of the technology in sufficient detail to enable those skilled in the art to practice the technology. Other embodiments may be utilized and changes may be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology may include a variety of combinations and/or integrations of the embodiments described herein.

Embodiments of the technology apply to the field of bicyclist performance analysis, and more specifically, to determining a bicyclist's bodily position based on measurements made with one or more force-measuring sensors. The ability to determine and record the bicyclist's bodily positions and changes between bodily positions during a ride enables a more detailed analysis of the bicyclist's performance. "Performance" may be defined as any objective metric such as speed, power output, total energy used, heart pulse rate, or other directly or indirectly determinable parameters, and also subjective metrics such as perceived exertion, fatigue level, or fit comfort.

The bicyclist may have several positioning options. The most basic distinction may be made in torso position, between sitting on the seat or standing on the pedals. Another distinction may be made in hand position, between, on a road bicycle, having the hands on the brake hoods or in the drops, or between, on a time trial bicycle, having the hands on the base bar or in the time trial extensions.

Determining whether the bicyclist is sitting or standing may be accomplished by measuring the radial and tangential forces applied to the pedal spindles, and observing one or more identifying features in those measurements that distinguish sitting from standing. A first identifying feature may be that when the bicyclist is standing, the radial force on either pedal will exceed the tangential force on every pedal cycle as the pedal crank rotates through the lower part of the rotation cycle. A second identifying feature may be that when the bicyclist is standing, the total vertical force on both pedals will be significantly higher, regardless of whether or not the bicyclist is pedaling. If the bicyclist's actual weight is known, then the knowledge of the vertical force on the pedals may be used to infer the force exerted on the handlebar, which may also be a useful metric.

Garmin's Vector™ pedals may be used to provide the measurements needed to distinguish between the sitting and standing positions. More specifically, the plurality of sensors described in U.S. Pat. No. 8,011,242 may be used to measure the radial, tangential, and other forces on the bicycle's pedals to facilitate observing one or more of the identifying features that distinguish one position from the other. The Vector™ pedals themselves may be configured to perform this analysis and/or other devices, such as Garmin's Edge® or Forerunner® global positioning system (GPS) devices, paired with the Vector™ pedals may perform this analysis to determine the bicyclist's bodily position.

In some cases, the geographic locations and time durations of the sitting intervals and the standing intervals may be of interest. As such, it may be desirable to combine records of bodily positions and changes between bodily positions with geolocation data such as might be obtained from GPS devices such as Garmin's Edge® or Forerunner® GPS devices. Similarly, in some cases, other bicycle performance metrics, such as speed or attitude, and bicyclist performance metrics, such as heart rate, associated with the sitting intervals and the standing intervals may be of interest. As such, it may be desirable to combine records of bodily positions and changes between bodily positions with records of such metrics.

When combined with Garmin's Edge® or Forerunner® GPS devices, the bicyclist may record their bodily position data along with correlated geographic location data and one or more performance metrics. The bodily position data may be provided to the bicyclist in real-time (via the Edge® or Forerunner® GPS devices or other devices such as smart phones) to allow the bicyclist to adjust their performance if necessary. Thus, embodiments of the invention may enable the Vector™ pedals (and/or a paired device such as the Edge® or Forerunner® GPS devices) to sense a bicyclist's bodily position in real time, display the bodily position in real time, and correlate the bodily position data with GPS location data and/or performance metrics data.

In one embodiment, the analysis to determine the bicyclist's position may use knowledge of the bicyclist's weight. The bicyclist's weight may be entered into the electronic device by having the bicyclist stand on the Vector™ pedals, wherein the pedals are configured to determine the bicyclist's weight, or by entering the weight into the head unit (e.g., the Edge® or Forerunner® devices).

Figure 2:
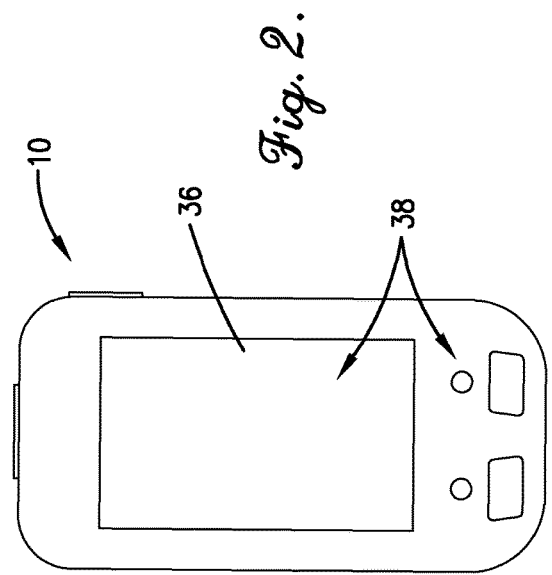
FIG. 2 is a plan view of the electronic device of FIG. 1.

Embodiments of the technology will now be described in more detail with reference to the drawing figures. Referring initially to FIGS. 1 and 2, an electronic device 10 configured to determine a bicyclist's bodily position while the bicyclist is riding a bicycle 12. The bicycle 12 is shown broadly comprising a frame 14, a seat 16, a handlebar 18, left and right pedals 20a,20b, and one or more sensors 22 associated with the left and right pedals 20a,20b. The electronic device 10 may be removably mountable on the bicycle 12, and is shown mounted on the handle bar 18 in FIG. 1 and unmounted in FIG. 2. The bicycle 12, including the frame 14, seat 16, handlebar 18, and left and right pedals 20a,20b may be of substantially any suitable type and design, and any details of these components of the system described herein or shown in the figures are for illustrative purposes only and are not limiting of the technology. For example, the bicycle 12 may be of any suitable type and design, such as a conventional road bicycle or a triathlon bicycle.

The one or more sensors 22 may be configured to measure a force exerted by the bicyclist on the left and right pedals 20a,20b. The sensors 22 may be of any suitable type and design configured to measure the force. In one embodiment, the sensors 22 may be substantially as described in U.S. Pat. No. 8,011,242 and configured to measure radial, tangential, and other forces on the left and right pedals 20a,20b to facilitate observing one or more identifying features that distinguish one bodily position of the bicyclist from another. The sensors 22 may be located, for example, on the left and right pedals 20a,20b themselves or on spindles coupled with the pedals 20a,20b. Such a plurality of sensors is incorporated into Garmin's Vector™ pedals, and therefore these particular pedals could function as the left and right pedals 20a,20b and the sensors 22. In one implementation, electronics associated with the pedals 20a,20b and/or the sensors 22 may be configured to perform the position-determining analysis on the force measurement data generated by the sensors 22. Additionally or alternatively, the electronic device 10, may be configured to receive the force measurement data from the sensors 22 and perform this analysis to identify the one or more identifying features to determine the bicyclist's bodily position.

Figure 3:
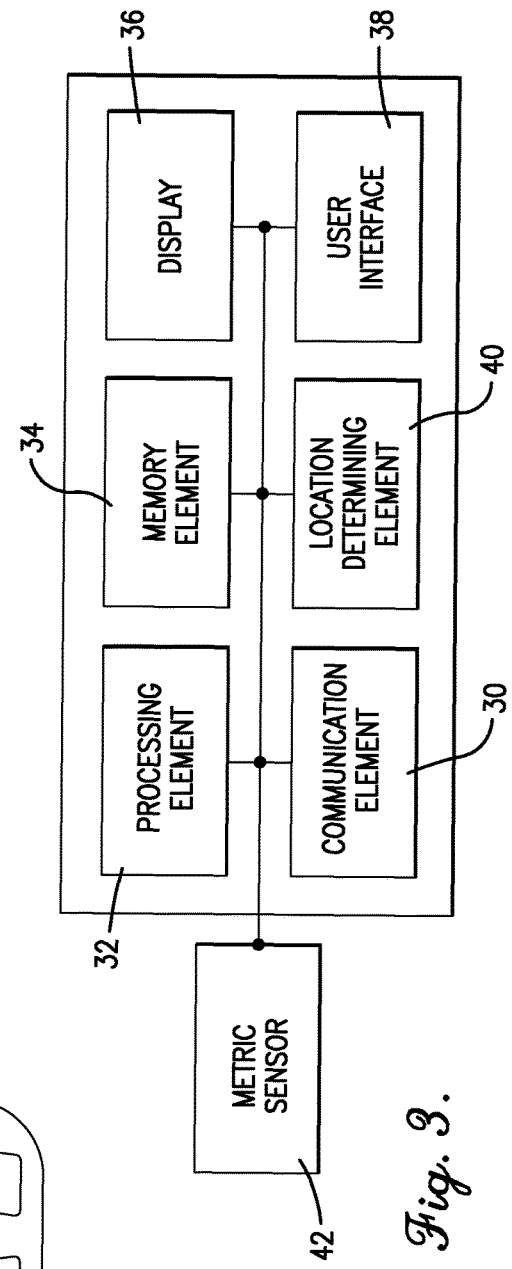
FIG. 3 is a schematic depiction of constituent elements of the electronic device of FIG. 1.

Referring also to FIG. 3, in an embodiment in which the electronic device 10 both performs the analysis and communicates the results, the electronic device 10 may include a communication element 30, a processing element 32, a memory element 34, and a display 36. The communication element 30 may be in wireless or wired communication with the sensors 22 and configured to receive the force measurement data generated by the sensors 22 regarding the force applied by the bicyclist to the left and right pedals 20a,20b. The communication element 30 may be implemented using any appropriate technology and design, and may include signal or data transmitting and receiving circuits, such as amplifiers, filters, mixers, oscillators, digital signal processors (DSPs), and the like. Furthermore, the communication element 30 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 30 may utilize communication standards such as ANT, ANT+, Bluetooth™ low energy (BLE), the industrial, scientific, and medical (ISM) band at 2.4 gigahertz (GHz), or the like. Additionally or alternatively, the communication element 30 may establish communication through connectors or couplers that receive metal conductor wires or cables or optical fiber cables.

The processing element 32 may be configured to analyze the received force measurement data to identify a feature of the data which is indicative of the bicyclist's bodily position. The processing element 32 may be implemented using any appropriate technology and design, and may include processors, microprocessors, microcontrollers, digital signal processors (DSPs), field-programmable gate arrays (FPGAs), analog and/or digital application-specific integrated circuits (ASICs), or the like, or combinations thereof. The processing element 32 may generally execute, process, or run instructions, code, code segments, software, firmware, programs, applications, apps, processes, services, daemons, or the like, or may step through the states of a finite-state machine.

The memory element 34 may be configured to record the results of the processing element's analysis over time as a series of changes in the bicyclist's bodily position while the bicyclist is riding the bicycle 12. The memory element 34 may be implemented using any appropriate technology and design, and may include data storage components such as read-only memory (ROM), programmable ROM, erasable programmable ROM, random-access memory (RAM), hard disks, floppy disks, optical disks, flash memory, thumb drives, universal serial bus (USB) drives, or the like, or combinations thereof. The memory element 34 may include, or may constitute, a "computer-readable medium." The memory element 34 may store instructions, code, code segments, software, firmware, programs, applications, apps, services, daemons, or the like that are executed by the processing element 32. The memory element 34 may also store settings, data, documents, sound files, photographs, movies, images, databases, and the like.

The display 36 may be configured to present the results of the processing element's analysis of the data in real-time or, for data stored in the memory element 34, at a later time. The display 36 may be implemented using any appropriate technology and design, such as light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. Furthermore, the display 36 may have a round, circular, or oval shape; may possess a square or a rectangular aspect ratio which may be viewed in either a landscape or a portrait mode; and may further include a lens or other covering overlying all or part of the display 36 and configured to enhance the visibility of the information shown on the display 36.

In one implementation, the electronic device 10 may further include a user interface 38 configured to allow the bicyclist or other user of the electronic device 10 to provide input regarding, for example, how the analysis is performed or how the results are displayed. The user interface 38 may be implemented using any appropriate technology and design, such as pushbuttons, rotating knobs, or the like, or combinations thereof. Furthermore, the user interface 38 may take the form of a touchscreen occupying part or all of the display 36 and allowing the user to interact with the electronic device 10 by physically touching, swiping, or gesturing on or near areas of the display 36. Additionally or alternatively, the user interface 38 may employ voice control technology or facial recognition technology.

Figure 4:
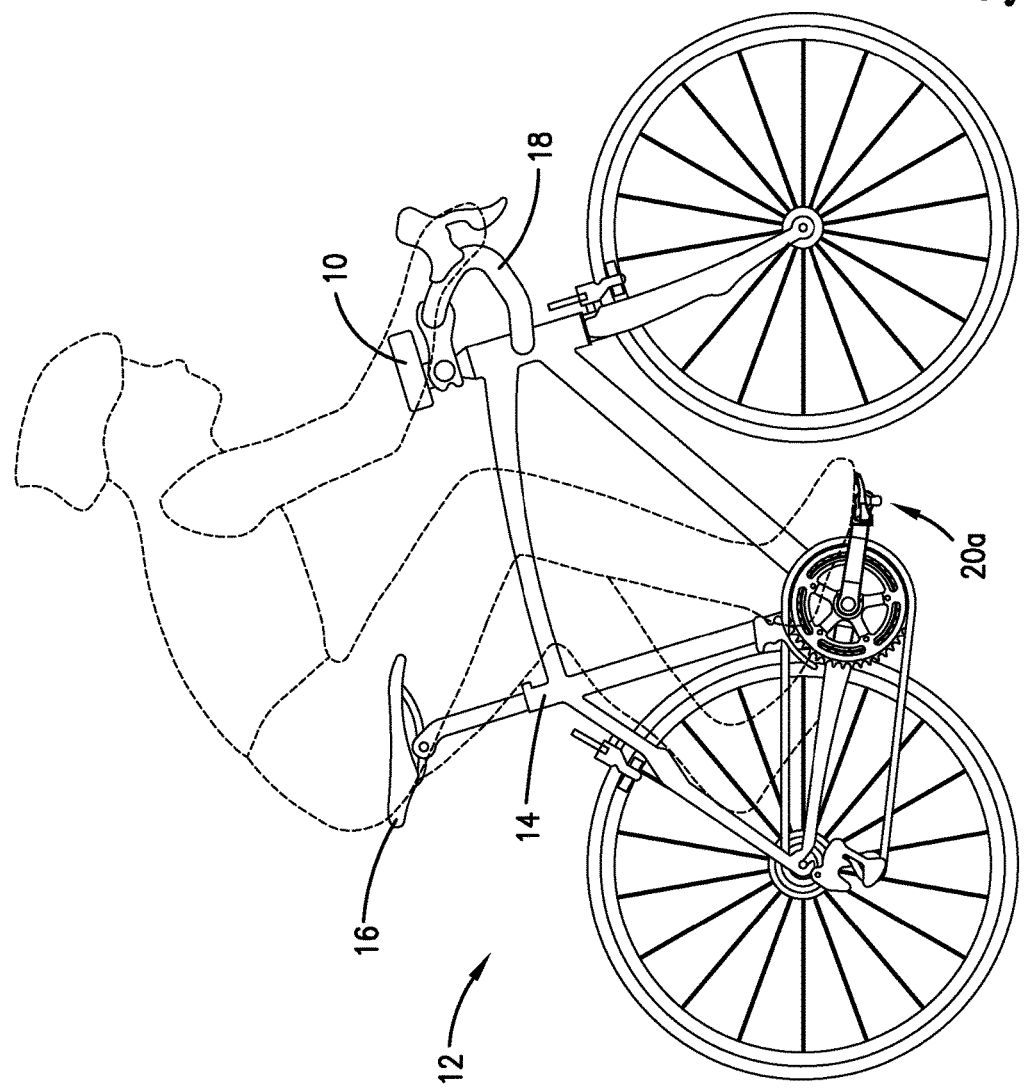
FIG. 4 is a side elevation view of the bicyclist (shown in broken line) in a sitting position.
Figure 5:
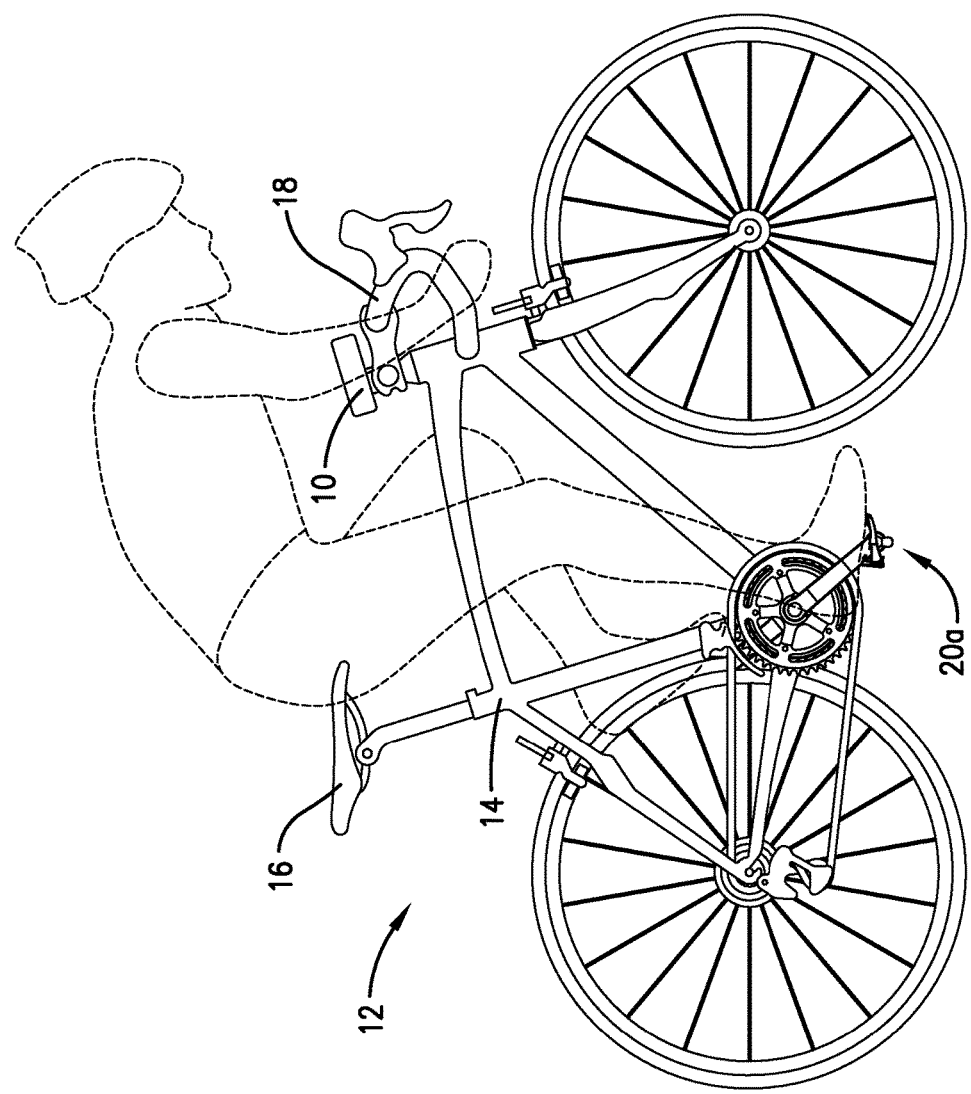
FIG. 5 is a side elevation view of the bicyclist (shown in broken line) in a standing position.
Figure 6:
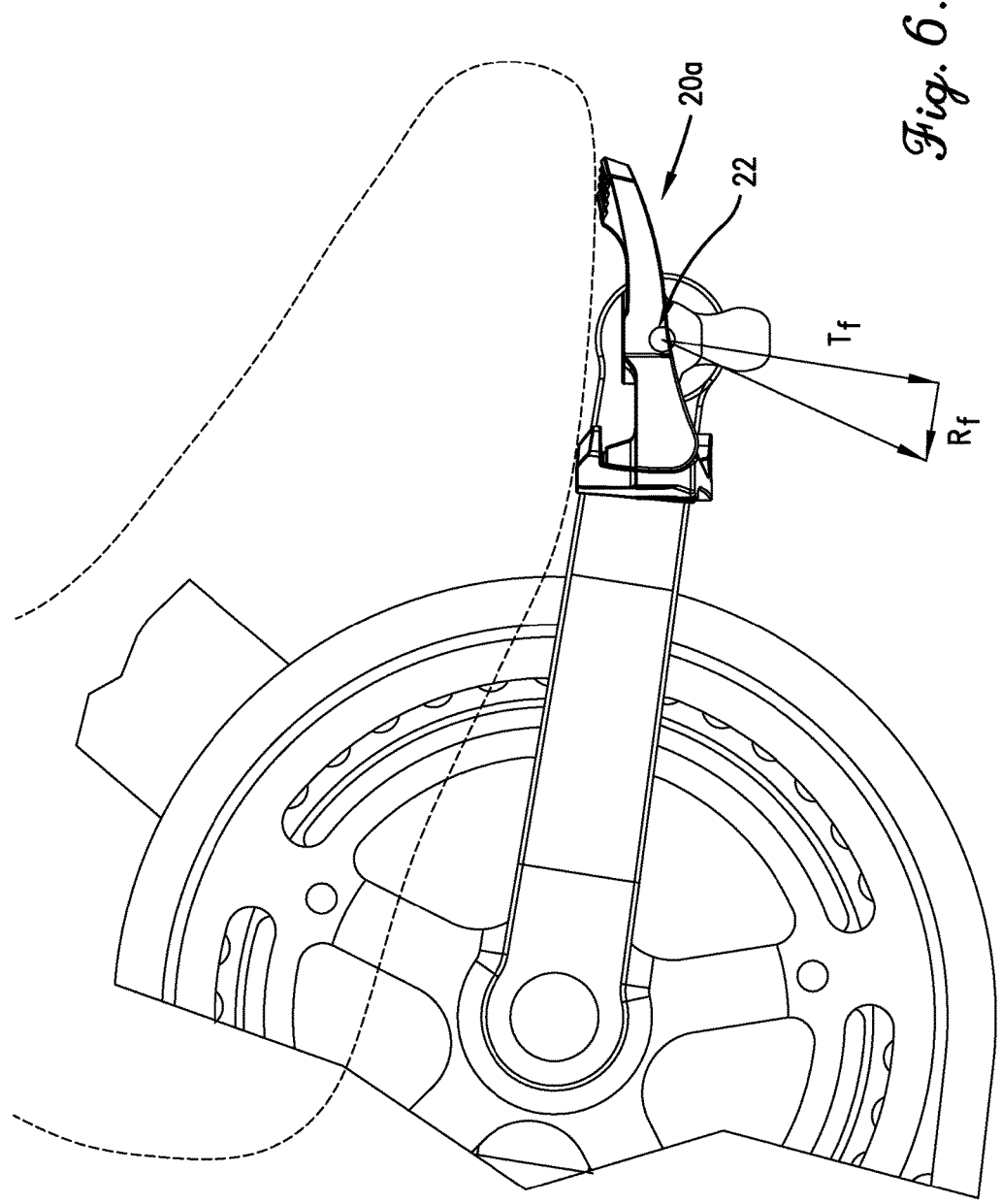
FIG. 6 is a fragmentary side elevation view of the bicyclist's foot (shown in broken line) exerting force on a pedal component of the bicycle of FIG. 1.
Figure 7:
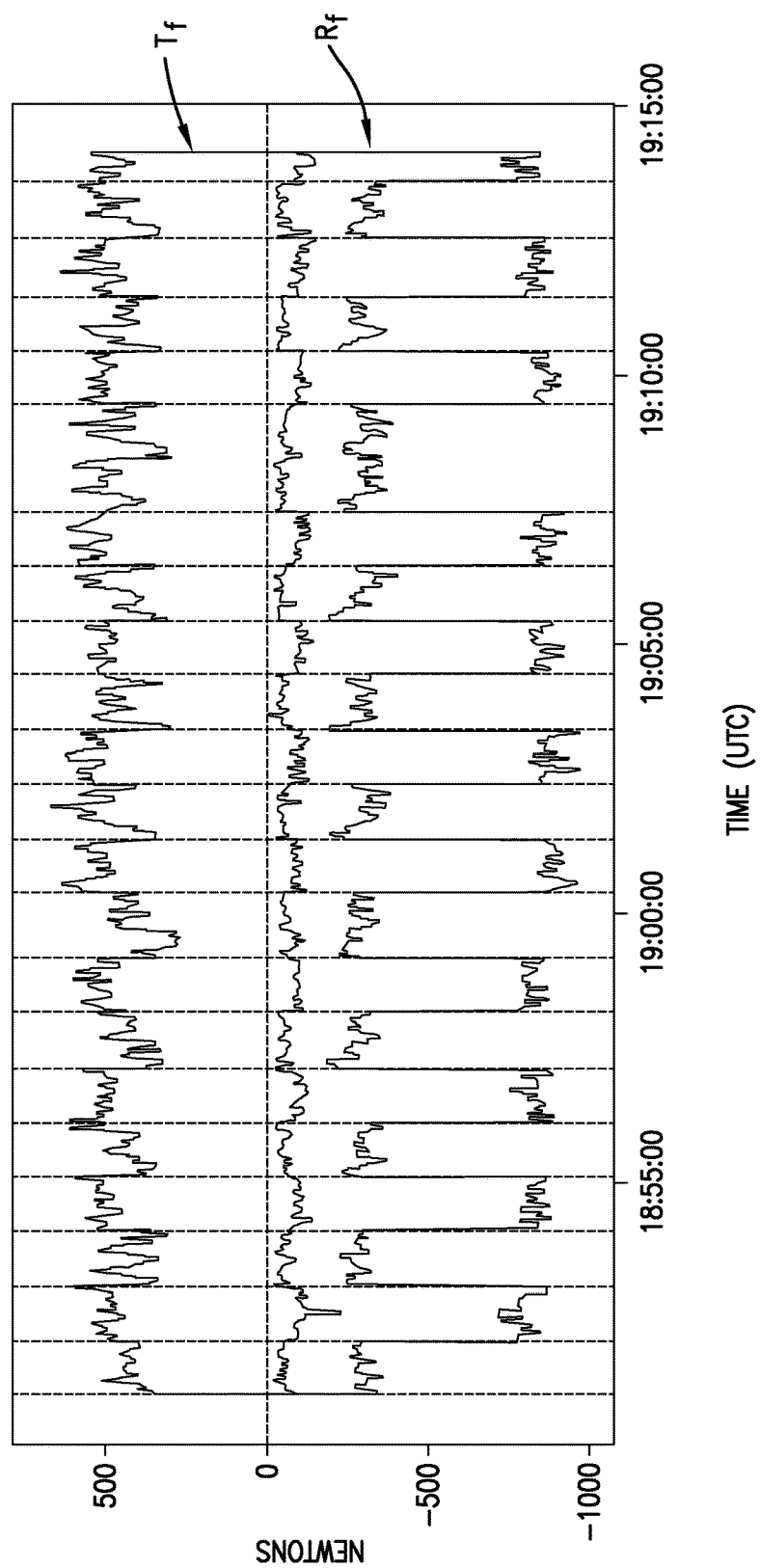
FIG. 7 is a graph of a radial force and a tangential force applied by the bicyclist's foot to the pedal component as measured over time by one or more sensor components of the bicycle of FIG. 1.

In one embodiment, the electronic device 10 may determine the bicyclist's bodily position with regard to whether the bicyclist is sitting on the seat 16 (as seen in FIG. 4) or standing on the left and right pedals 20a,20b (as seen in FIG. 5). In this embodiment, the sensors 22 may be configured to measure a radial force and a tangential force applied by the bicyclist to the left and right pedals 20a,20b. Referring also to FIGS. 6 and 7, in this embodiment, a feature of the data which is indicative of the bicyclist's bodily position is that the radial force $R_f$ is higher than the tangential force $T_f$ when the bicyclist is standing, and the radial force $R_f$ is lower than the tangential force $T_f$ when the bicyclist is sitting. In another embodiment, the sensors 22 may be configured to measure a total vertical force applied by the bicyclist to the left and right pedals 20a,20b. In this embodiment, a feature of the data which is indicative of the bicyclist's bodily position is that the total vertical force on the left and right pedals 20a,20b is at a higher level when the bicyclist is standing on the left and right pedals 20a,20b, and the total vertical force on the left and right pedals 20a,20b is at a lower level when the bicyclist is sitting on the seat 16.

In various additional or alternative embodiments, the processing element 32 may be further configured to infer an amount of force applied by the bicyclist to the handlebar 18 based on the total vertical force and an actual weight of the bicyclist. The processing element 32 may be further configured to determine the actual weight of the bicyclist based on the force applied by the bicyclist to the left and right pedals 20a,20b when standing upright and otherwise unsupported on the left and right pedals 20a,20b. In one implementation, the bicyclist's actual weight may be inferred from the maximum net vertical force applied to the pedals 20a,20b. The electronic device 10 may further determine the bicyclist's position with regard to how the bicyclist is gripping the handlebar 18. In one implementation, if the bicyclist's actual weight is known, and the net force being applied to the pedals 20a,20b is known, then any difference between the two values must be borne by either the seat 16 or the handlebar 18, and if one of these values is inferred or otherwise determined, then the other value is known. Furthermore, if the force being applied to the handlebar 18 is known, then the bicyclist's grip on the handlebar 18 can be inferred.

In one embodiment, the electronic device 10 may further include or otherwise be in communication with via the communication element 30 a location-determining element 40 configured to determine a geographic location of the bicyclist while the bicyclist is riding the bicycle. In this embodiment, the memory element 34 may be further configured to record a series of changes in the geographic location, the processing element 32 may be further configured to correlate the series of changes in the bicyclist's bodily position with the series of changes in the geographic location, and the display 36 may be further configured to graphically communicate the correlated series of changes in the bicyclist's bodily position and the series of changes in the geographic location. Exemplary electronic devices having such location-determining capability include Garmin's Edge® and Forerunner® GPS devices, and therefore either of these particular devices could be configured to function as the electronic device 10.

More broadly, the location-determining element 40 may be implemented using any appropriate technology and design, such as receiving and processing radio frequency (RF) signals from a global navigation satellite system (GNSS) such as the global positioning system (GPS) primarily used in the United States, the GLONASS system primarily used in the Soviet Union, the BeiDou system primarily used in China, or the Galileo system primarily used in Europe. The location-determining element 40 may accompany or include an antenna to assist in receiving the satellite signals. The antenna may be a patch antenna, a linear antenna, or any other type of antenna that may be used with location or navigation devices. The location-determining element 40 may include satellite navigation receivers, processors, controllers, other computing devices, or combinations thereof, and memory. The location-determining element 40 may process a signal, referred to herein as a "location signal", from one or more satellites that includes data from which geographic information such as the current geolocation is derived. The current geolocation may include coordinates, such as the latitude and longitude, of the current location of the electronic device 10.

It will be appreciated that substantially any other location-determining technology may be used. For example, cellular towers or any customized transmitting radio frequency towers may be used instead of satellites may be used to determine the location of the electronic device 10 by receiving data from at least three transmitting locations and then performing basic triangulation calculations to determine the relative position of the device with respect to the transmitting locations. With such a configuration, any standard geometric triangulation algorithm may be used to determine the location of the electronic device 10. The location-determining element 40 may also include or be coupled with a pedometer, accelerometer, compass, or other dead-reckoning components which allow it to determine the location of the electronic device 10. The location-determining element 40 may determine the current geographic location through a communications network, such as by using Assisted GPS (A-GPS), or from another electronic device. The location-determining element 40 may even receive location data directly from the user.

In another embodiment, the electronic device 10 may further include or otherwise be in communication with via the communication element 30 one or more performance metric sensors 42 configured to measure one or more aspects of the bicycle's or the bicyclist's performance. These aspects may be objective or subjective, and may include any one or more of a speed of the bicycle 12, an attitude of the bicycle 12, a power output of the bicyclist, a total energy used by the bicyclist, a heart rate of the bicyclist, an exertion perceived by the bicyclist, a fatigue level of the bicyclist, a cadence of the bicyclist, and a fit comfort of the bicyclist. In this embodiment, the memory element 34 may be further configured to record a series of changes in one or more performance metrics, the processing element 32 may be further configured to correlate the series of changes in the bicyclist's bodily position with the series of changes in the one or more performance metrics, and the display 36 may be further configured to graphically communicate the correlated series of changes in the bicyclist's bodily position and the series of changes in the one or more performance metrics.

Figure 8:
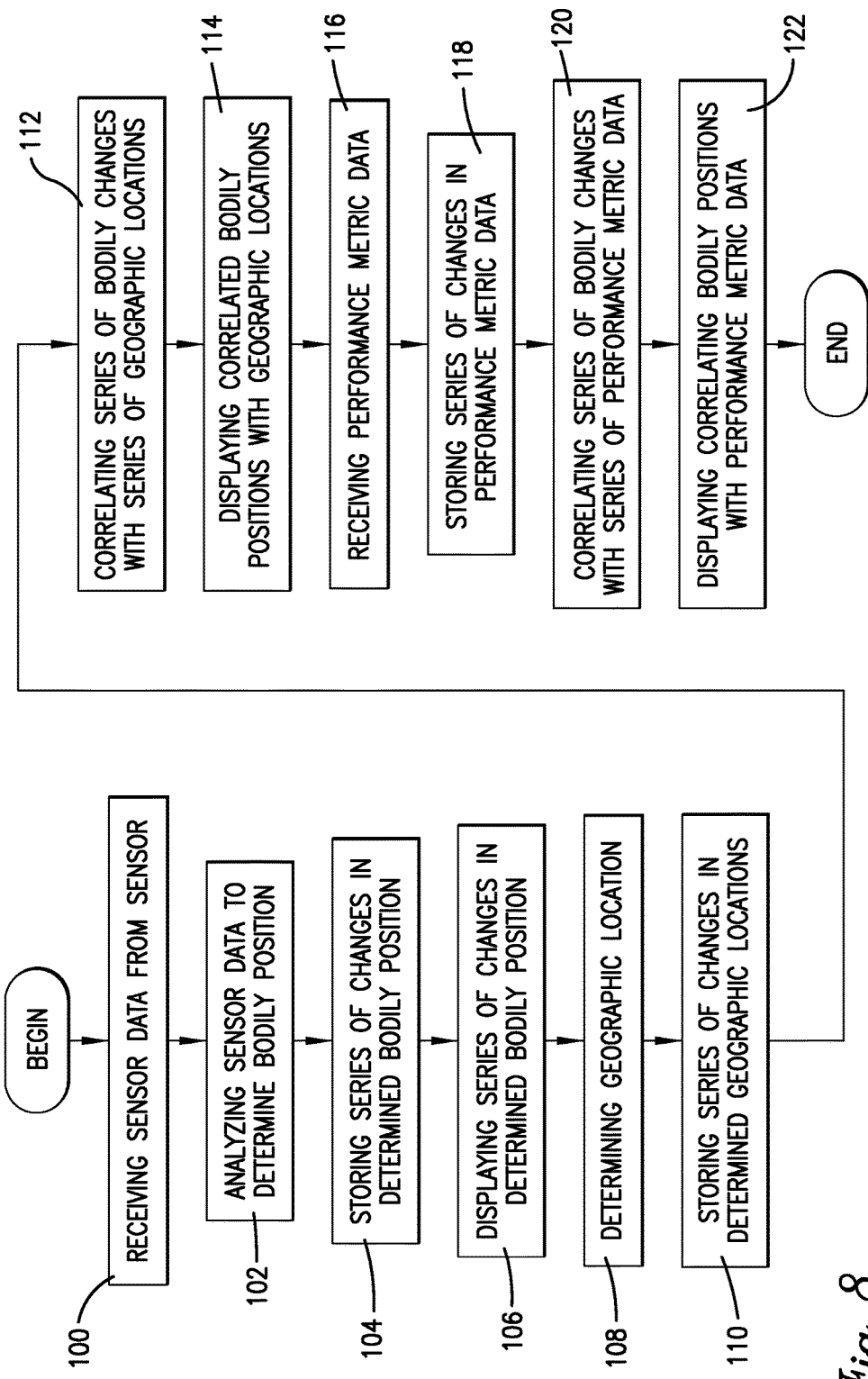
FIG. 8 is a flowchart of steps involved in a method implemented by the electronic device of FIG. 1.

Referring also to FIG. 8, in operation the electronic device 10 may function substantially as follows to determine the bicyclist's bodily position while the bicyclist is riding the bicycle 12. Broadly, the communication element 30 of the electronic device 10 may receive sensor data from the one or more force-measuring sensors 22 regarding the force applied by the bicyclist to the left and right pedals 20*a*,20*b*, as shown in step 100. The sensor data may be provided to the processing element 32 which analyzes it to identify a feature of the data which is indicative of the bicyclist's bodily position, as shown in step 102. The result of the processing element's 32 analysis may be provided to the memory element 34 to be stored as a series of changes in the bicyclist's bodily position while the bicyclist is riding the bicycle 12, as shown in step 104. The bicyclist's current bodily position and/or the series of changes in the bicyclist's bodily position may be provided to the display 36 to be graphically displayed for the user in real-time or post-ride, as shown in step 106.

In one embodiment, the location-determining element 40 of the electronic device 10 may determine the geographic location of the bicyclist, as shown in step 108. The geographic location data may be provided to the memory element 34 to be stored as a series of changes in the geographic location of the bicyclist while the bicyclist is riding the bicycle 12, as shown in step 110. The processing element 32 may then correlate the series of changes in the bicyclist's bodily position with the series of changes in the geographic location, as shown in step 112. The correlated series of changes in the bicyclist's bodily position and the series of changes in the geographic location may be provided to the display 36 to be graphically displayed for the user, as shown in step 114.

In another embodiment, the communication element 30 of the electronic device 10 may receive performance metric data from the one or more performance metric sensors 42 regarding the performance metrics being measured, as shown in step 116. The performance metric data may be provided to the memory element 34 to be stored as a series of changes in the performance metrics being measured while the bicyclist is riding the bicycle 12, as shown in step 118. The processing element 32 may then correlate the series of changes in the bicyclist's bodily position with the series of changes in the one or more performance metrics, as shown in step 120. The correlated series of changes in the bicyclist's bodily position and the series of changes in the one or more performance metrics may be provided to the display 36 to be graphically displayed for the user, as shown in step 122.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. An electronic device configured to determine a bicyclist's bodily position while the bicyclist is riding a bicycle, wherein the bicycle includes a seat, a handlebar, left and right pedals, and one or more force sensors configured to measure a force applied by the bicyclist to the left and right pedals, the electronic device comprising:

a communication element configured to receive data from the one or more force sensors including a measured force applied by the bicyclist to the left and right pedals, the data including a radial force and a tangential force;

a memory element configured to store the received data and an actual weight of the bicyclist; and a processing element coupled with the communication element and the memory element, the processing element configured to:
  determine a total vertical force applied by the bicyclist to the left and right pedals,
  determine the bicyclist's bodily position as being one of the bicyclist sitting on the seat or the bicyclist standing on the left and right pedals based on the radial force and the tangential force at a lower portion of a pedal rotation cycle, and
  determine an amount of force applied by the bicyclist to the handlebar based on the total vertical force and the stored weight of the bicyclist.

2. The electronic device as set forth in claim 1, wherein the processing element is further configured to determine the bicyclist is standing on the pedals when the radial force is higher than the tangential force at a lower portion of the pedal rotation cycle.

3. The electronic device as set forth in claim 1, wherein the processing element is further configured to determine the bicyclist is sitting on the seat when the radial force is lower than the tangential force at a lower portion of the pedal rotation cycle.

4. The electronic device as set forth in claim 1, wherein the one or more force sensors are configured to measure a total vertical force applied by the bicyclist to the left and right pedals, and wherein the processing element is further configured to determine that the bicyclist changed from a seated to a standing bodily position when the total vertical force on the left and right pedals increases from a lower level of total vertical force to a higher level of total vertical force.

5. The electronic device as set forth in claim 1, wherein the memory element is further configured to record the determined bodily position and a series of changes in the bicyclist's bodily position while the bicyclist is riding the bicycle.

6. The electronic device as set forth in claim 5, wherein the processing element is further configured to:
  determine when the bicyclist is standing upright on the left and right pedals, and
  determine the actual weight of the bicyclist based on the data received from the force sensors associated with the force applied by the bicyclist to the left and right pedals when standing upright.

7. The electronic device as set forth in claim 1, further comprising—
  a display; and
  a location-determining element configured to determine a geographic location of the electronic device; and
  wherein the memory element is further configured to store the determined bicyclist bodily position geographic location; and
  wherein the processing element is further configured to:
    determine a series of changes in the bicyclist's bodily position,
    correlate the series of changes in the bicyclist's bodily position with the series of changes in the geographic location; and
    control the display to graphically communicate the correlated series of changes in the bicyclist's bodily position and the series of changes in the geographic location.

8. The electronic device as set forth in claim 1, further comprising—
  a display;
  wherein the bicycle further includes one or more performance metric sensors configured to measure the one or more performance metrics of the bicyclist or the bicycle while the bicyclist is riding the bicycle;
  wherein the memory element is further configured to record a series of changes in the one or more performance metrics; and
  wherein the processing element is further configured to:
    determine a series of changes in the bicyclist's bodily position,
    correlate the series of changes in the bicyclist's bodily position with the series of changes in the one or more performance metrics, and
    control the display to graphically communicate the correlated series of changes in the bicyclist's bodily position and the series of changes in the one or more performance metrics.

9. The electronic device as set forth in claim 1, wherein the processing element is further configured to determine the bicyclist's grip on the handlebar based on the data received from the one or more force sensors.

10. The electronic device as set forth in claim 1, further comprising a display, wherein the processing element is further configured to control the display to graphically communicate the determined bodily position.

11. An electronic device configured to determine a bicyclist's bodily position while the bicyclist is riding a bicycle, wherein the bicycle includes a seat, a handlebar, left and right pedals, one or more force sensors configured to measure a radial force and a tangential force applied by the bicyclist to the left and right pedals, and one or more performance metric sensors configured to measure one or more performance metrics of the bicyclist or the bicycle while the bicyclist is riding the bicycle, the electronic device comprising—
  a display;
  a location-determining element configured to determine a geographic location of the electronic device;
  a communication element configured to receive the one or more performance metrics from the one or more performance metric sensors and data from the one or more force sensors relating to the radial and tangential forces applied by the bicyclist to the left and right pedals;
  a memory element configured to store the received data and an actual weight of the bicyclist; and
  a processing element coupled with the location-determining element the communication element, and the memory element, the processing element configured to:
    determine a total vertical force applied by the bicyclist to the left and right pedals,
    determine a standing bodily position when the radial force is higher than the tangential force at a lower portion of a pedal rotation cycle,
    determine a sitting bodily position when the radial force is lower than the tangential force at a lower portion of the pedal rotation cycle,
    determine a series of changes in the bicyclist's bodily position, the geographic location and the one or more performance metrics,
    determine an amount of force applied by the bicyclist to the handlebar based on the total vertical force and the stored weight of the bicyclist, and
    control the display to graphically communicate a correlated series of changes in the bicyclist's bodily position, the series of changes in the geographic location, and the series of changes in the one or more performance metrics.

12. A method of determining a bicyclist's bodily position while the bicyclist is riding a bicycle, wherein the bicycle includes a seat, a handlebar, left and right pedals, and one or more force sensors configured to measure a force applied by the bicyclist to the left and right pedals, the method comprising the steps of:

storing, using a memory element, an actual weight of the bicyclist;

receiving, via a communication element, data from the one or more force sensors relating to the force applied by the bicyclist to the left and right pedals, the data including a radial force and a tangential force;

analyzing, using a processing element, the received data to determine the bicyclist's bodily position as one of the bicyclist sitting on the seat or the bicyclist standing on the left and right pedals based on the radial force and the tangential force at a lower portion of a pedal rotation cycle;

determining, using the processing element, a total vertical force applied by the bicyclist to the left and right pedals;

determining, using the processing element, a series of changes in the bicyclist's bodily position while the bicyclist is riding the bicycle;

determining, using the processing element, an amount of force applied by the bicyclist to the handlebar based on the total vertical force and a stored weight of the bicyclist; and graphically communicating, using a display, the series of changes in the bicyclist's bodily position.

13. The method as set forth in claim 12, wherein the processing element determines the bicyclist is standing on the pedals when the radial force is higher than the tangential force at the lower portion of the pedal rotation cycle.

14. The method as set forth in claim 12, wherein the processing element determines the bicyclist is sitting on the seat when the radial force is lower than the tangential force at the lower portion of the pedal rotation cycle.

15. The method as set forth in claim 13, wherein the one or more force sensors are configured to measure a total vertical force applied by the bicyclist to the left and right pedals, and wherein the method further comprises the step of determining, using the processing element, the bicyclist changed from a seated to a standing bodily position when the total vertical force on the left and right pedals increases from a lower level of total force to a higher level of total force.

16. The method as set forth in claim 12, wherein the actual weight of the bicyclist is determined based on the force applied by the bicyclist to the left and right pedals when the bicyclist is standing upright and otherwise unsupported on the left and right pedals.

17. The method as set forth in claim 12, further comprising the steps of— determining, using a location-determining element, a geographic location of the bicyclist while the bicyclist is riding the bicycle;

storing, using a memory element, a series of changes in the geographic location;

correlating, using the processing element, the series of changes in the bicyclist's bodily position with the series of changes in the geographic location; and graphically communicating, on the display, the correlated series of changes in the bicyclist's bodily position and the series of changes in the geographic location.

18. The method as set forth in claim 12, further comprising the steps of— receiving, via the communication element, data from a performance metric sensor relating to a performance metric of the bicycle or the bicyclist;

storing, using a memory element, a series of changes in the performance metric;

correlating, using the processing element, the series of changes in the bicyclist's bodily position with the series of changes in the performance metric; and graphically communicating, on the display, the correlated series of changes in the bicyclist's bodily position and the series of changes in the performance metric.

19. The method as set forth in claim 12, further comprising the step of determining, using the processing element, the bicyclist's grip on the handlebar based on the data received from the one or more force sensors.

* * * * *